Patented Feb. 3, 1942

2,271,674

UNITED STATES PATENT OFFICE 2,271,674

2 - KETO - 1,2,3,4 - TETRAHYDRONAPHTHA-LENES AND A METHOD FOR PRODUCING THEM

Hans Andersag and Walter Salzer, Wuppertal-Elberfeld, Germany, assignors to Winthrop Chemical Company, Inc., New York, N. Y., a corporation of New York No Drawing. Application May 16, 1939, Serial No. 274,008. In Germany May 17, 1938

15 Claims. (Cl. 260—590)

This invention relates to new condensation products and to a process of manufacturing the same.

It is known that 2-keto-1,2,3,4-tetrahydronaphthalene is a rather unstable compound and does not enter the reactions which are normal for compounds having a methylene group linked to a keto group (compare for instance, Berichte der deutschen chemischen Gesellschaft, 55 [1922], page 3661); thus, for instance, neither bromine nor the nitroso group could be introduced and no definite condensation products were obtained when reacting with benzaldehyde or salicylaldehyde upon the 2-keto-1,2,3,4-tetrahydronaphthalene.

In accordance with the present invention it is most surprising that well defined condensation products of 2-keto-1,2,3,4-tetrahydronaphthalene, its substitution products respectively, can be obtained when reacting upon the 2-keto-1,2,3,4-tetrahydronaphthalene, its substitution products respectively, with an organic compound containing a reactive group in the presence of a strongly alkaline condensing agent. The new condensation products have proved to be 2-keto-1,2,3,4-tetrahydronaphthalenes into which the radical of the organic compound containing the reactive group has entered in the 1-position. The reaction is advantageously carried out in a solvent which is inert to the starting materials, such as ether, benzene, toluene, xylene and so on. The alkali metals themselves, alkali metal amides, -oxides or -hydroxides or -alcoholates as well as the strongly alkaline reacting alkaline earth metals, their corresponding compounds respectively, may be used as strongly alkaline condensing agents. The compounds containing a reactive substituent may be of the most varied kind, they may be derived from hydrocarbons or from acid compounds or also from basic compounds; of course other substituents may be present. Halogen atoms are preferred as the reactive substituent; for instance simple halogenalkyl compounds, such as methylbromide, methyliodide, allylchloride or -bromide, or substituted halogenalkyl compounds, for instance aminoalkyl halides may be used, furthermore the halides of organic acids, such as acetic, propionic, benzoic acid and so on; also the esters of such acids may be used.

The products thus obtainable are useful as starting materials for chemical syntheses.

The invention is illustrated by the following examples the parts being by weight:

88 parts of 2-keto-1,2,3,4-tetrahydronaphthalene, 112 parts of 1-diethylamino-2-chloroethane, 29 parts of sodium-amine and 500 parts of absolute ether are heated to boiling for 12 hours on the water-bath. Thereupon the reaction mixture is washed with water and distilled. After some first runnings consisting of unchanged starting-base and 2-keto-1,2,3,4-tetrahydronaphthalene the 1-diethylaminoethyl-2-keto-1,2,3,4-tetrahydronaphthalene is obtained as a viscous oil boiling at 143° C. under 1 mm. pressure.

When starting from 60 parts of 2-keto-1,2,3,4-tetrahydronaphthalene, 18 parts of sodiumamide, 70 parts of beta-phenylethylbromide and 300 parts of ether and when proceeding in the manner as described above, the 1-(beta-phenylethyl)-2-keto-1,2,3,4-tetrahydronaphthalene is obtained as a viscous oil boiling at 210° C. under 6 mm. pressure.

The 1-benzyl-2-keto-1,2,3,4-tetrahydronaphthalene is obtained as a viscous oil boiling at 195° C. under 5 mm. pressure from 14.6 parts of 2-keto-1,2,3,4-tetrahydronaphthalene, 12.6 parts of benzylchloride, 4 parts of sodiumamide and 100 parts of ether.

The 1-(3'-methoxybenzyl)-2-keto-1,2,3,4-tetrahydronaphthalene is obtained as a viscous oil boiling at 195° C. under 0.4 mm. pressure from 14.6 parts of 2-keto-1,2,3,4-tetrahydronaphthalene, 11 parts of 3-methoxybenzylchloride, 4 parts of sodiumamide and 100 parts of ether.

The 1-(beta-phenylethyl)-2-keto-1,2,3,4-tetrahydro-6-methoxynaphthalene is obtained as a viscous oil boiling at 185–190° C. under 0.1 mm. pressure from 17 parts of 6-methoxy-2-keto-1,2,3,4-tetrahydronaphthalene, 20 parts of beta-phenylethylbromide, 5 parts of sodiumamide and 100 parts of ether.

The 1-(3'-methoxybenzyl)-2-keto-1,2,3,4-tetrahydro-6-methoxynaphthalene is obtained as a viscous oil boiling at 195° C. under 0.15 mm. pressure from 9 parts of 2-keto-1,2,3,4-tetrahydro-6-methoxynaphthalene, 7 parts of 3-methoxybenzyl-chloride, 2 parts of sodiumamide and 50 parts of ether.

The 1-(3'-methoxy-beta-phenylethyl)-2-keto-1,2,3,4-tetrahydro-6-methoxynaphthalene is obtained as a viscous oil boiling at 200–205° C. under 0.2 mm. pressure from 21 parts of 2-keto-1,2,3,4-tetrahydro-6-methoxynaphthalene, 4.7 parts of sodiumamide, 25 parts of 3-methoxy-beta-phenylethylbromide and 200 parts of ether.

The 2-keto-1,2,3,4-tetrahydro-6-methoxynaphthalene is obtained, for instance, according to U. S. Patent 2,223,664.

We claim:

1. 2-keto-1, 2, 3, 4-tetrahydronaphthalenes which in the 1-position are linked to a carbon atom of an organic radical selected from the group consisting of the alkyl-, aminoalkyl- and aliphatically bound phenyl-radicals.

2. 2-keto-1, 2, 3, 4-tetrahydronaphthalenes which are substituted in the 1-position by a phenylalkyl radical.

3. 2-keto-1, 2, 3, 4-tetrahydro-6-methoxynaphthalenes which in the 1-position are linked to a carbon atom of an organic radical selected from the group consisting of the alkyl-, aminoalkyl- and aliphatically bound phenyl-radicals.

4. 2-keto-1, 2, 3, 4-tetrahydro-6-methoxynaphthalenes which are substituted in the 1-position by a phenylalkyl radical.

5. The process which comprises reacting upon a 2-keto-1, 2, 3, 4-tetrahydronaphthalene in the presence of a strongly alkaline condensing agent and of a solvent which is inert to the starting materials with an organic compound having a reactive halogen atom.

6. The process which comprises reacting upon a 2-keto-1, 2, 3, 4-tetrahydronaphthalene in the presence of a strongly alkaline condensing agent and of a solvent which is inert to the starting materials with an organic compound having a reactive halogen atom in aliphatic linkage.

7. The process which comprises reacting upon a 2-keto-1, 2, 3, 4,-tetrahydronaphthalene in the presence of a strongly alkaline condensing agent and of a solvent which is inert to the starting materials with a phenylalkyl compound the alkyl group of which contains a reactive halogen atom.

8. The process which comprises reacting upon a 2-keto-1, 2, 3, 4-tetrahydro-6-methoxynaphthalene in the presence of a strongly alkaline condensing agent and of a solvent which is inert to the starting materials with an organic compound having a reactive halogen atom.

9. The process which comprises reacting upon a 2-keto-1, 2, 3, 4-tetrahydro-6-methoxynaphthalene in the presence of a strongly alkaline condensing agent and of a solvent which is inert to the starting materials with an organic compound having a reactive halogen atom in aliphatic linkage.

10. The process which comprises reacting upon a 2-keto-1, 2, 3, 4-tetrahydro-6-methoxynaphthalene in the presence of a strongly alkaline condensing agent and of a solvent which is inert to the starting materials with a phenylalkyl compound the alkyl group of which contains a reactive halogen atom.

11. Process as claimed in claim 6 in which the reactive substituent is a halogen atom.

12. Process as claimed in claim 7 in which the reactive substituent is a halogen atom.

13. Process as claimed in claim 8 in which the reactive substituent is a halogen atom.

14. Process as claimed in claim 9 in which the reactive substituent is a halogen atom.

15. Process as claimed in claim 10 in which the reactive substituent is a halogen atom.

HANS ANDERSAG.
WALTER SALZER.